(12) United States Patent
Wilson

(10) Patent No.: US 8,729,488 B2
(45) Date of Patent: May 20, 2014

(54) ASSAYING OF WASTE

(75) Inventor: Mark Wilson, Whitehaven (GB)

(73) Assignee: VT Nuclear Services Limited, Southampton, Hampshire (GB)

( * ) Notice: Subject to any disclaimer, the term of this patent is extended or adjusted under 35 U.S.C. 154(b) by 316 days.

(21) Appl. No.: 13/121,139

(22) PCT Filed: Sep. 28, 2009

(86) PCT No.: PCT/GB2009/002289
§ 371 (c)(1),
(2), (4) Date: May 31, 2011

(87) PCT Pub. No.: WO2010/035003
PCT Pub. Date: Apr. 1, 2010

(65) Prior Publication Data
US 2011/0215255 A1  Sep. 8, 2011

(30) Foreign Application Priority Data

Sep. 26, 2008 (GB) .................................. 0817703.2

(51) Int. Cl.
*G01V 5/00* (2006.01)
*B07C 5/346* (2006.01)
(52) U.S. Cl.
CPC .............. *G01V 5/0075* (2013.01); *B07C 5/346* (2013.01); *G01V 5/0008* (2013.01)
USPC ...................................................... 250/394
(58) Field of Classification Search
CPC ..... G01V 5/0075; G01V 5/0008; B07C 5/346
USPC ....................................................... 250/394
See application file for complete search history.

(56) References Cited

U.S. PATENT DOCUMENTS 2,717,693 A * 9/1955 Holmes .......................... 209/562
3,035,173 A    5/1962 Koch et al.
(Continued)

FOREIGN PATENT DOCUMENTS

| WO | WO 00/42447 | 7/2000 |
| WO | WO 2010/035003 | 4/2010 |

OTHER PUBLICATIONS

Stephen Croft et al., *The Estimation of the Minimum Detectable Activity from Measured Passive Neutron Coincidence Counter Data*, Canberra Industries, Inc., 2005, 10 pages.

(Continued)

*Primary Examiner* — Constantine Hannaher
(74) *Attorney, Agent, or Firm* — Workman Nydegger

(57) ABSTRACT

A method for investigating a volume of material at an investigation location for radioactive material includes: detecting signals from a first detector caused by the interaction of one or more types of emission from the radioactive material with the first detector; detecting signals from a second detector caused by the interaction of cosmic rays and/or one or more types of particle generated by cosmic rays with the second detector; processing the signals from the first detector to provide information on the amount of radioactive material associated with the volume of material; processing the signals from the second detector to provide information on the amount of cosmic rays and/or one or more types of particle generated by cosmic rays incident on the investigation location; and correcting the information on the amount of radioactive material associated with the volume of material using the amount of cosmic rays and/or one or more types of particle generated by cosmic rays incident on the investigation location, thereby providing corrected information on the amount of radioactive material associated with the volume of material.

21 Claims, 2 Drawing Sheets

(56) References Cited

U.S. PATENT DOCUMENTS

| | | | | |
|---|---|---|---|---|
| 4,617,466 | A | * | 10/1986 | Menlove et al. ......... 250/390.04 |
| 4,686,368 | A | * | 8/1987 | Anderson et al. ............. 250/374 |
| 5,594,250 | A | | 1/1997 | Condreva |
| 6,420,712 | B1 | | 7/2002 | Menlove et al. |
| 6,509,563 | B1 | | 1/2003 | McElroy, Jr. et al. |
| 2005/0105681 | A1 | | 5/2005 | Kang et al. |
| 2006/0033036 | A1 | | 2/2006 | Hailey |
| 2006/0081787 | A1 | | 4/2006 | Prasad et al. |
| 2007/0001123 | A1 | | 1/2007 | Andrews et al. |
| 2010/0010764 | A1 | | 1/2010 | Lightfoot |

OTHER PUBLICATIONS

Stephen Croft et al., *The Specific Total and Coincidence Cosmic-Ray-Induced Neutron Production Rates in Materials*, Nuclear Instruments and Methods in Physics Research, A 505 (2003), pp. 536-539.

H. O. Menlove et al., *The Design of a High-Efficiency Neutron Counter for Waste Drums to Provide Optimized Sensitivity for Plutonium Assay*, 5th Nondestructive Assay and Nondestructive Examination Waste Characterization Conference, Salt Lake City, Utah, Jan. 14-16, 1997.

J. Wolf, *Measurement of Muon Induced Neutron Background at Shallow Sites*, University of Karlsruhe, arXiv:hep-ex/0211032v1, Nov. 12, 2002, 6 pages.

G. Chapline et al., *Cosmic Ray Induced Neutron and Gamma-Ray Bursts in a Lead Pile*, UCRL-TR-230895, May 2007, 7 pages.

H. M. Araujo et al., *Measurements of Neutrons Produced by High-Energy Muons at the Boulby Underground Laboratory*, arXiv:0805.3110v1, May 20, 2008, 27 pages.

*Measurement of Muon Flux as a Function of Elevation*, The Cosmic Connection, www.lbl.gov/abc/cosmic/index.html, published at least as early as Sep. 13, 2001, 2 pages.

P. K. F. Grieder, *Cosmic Rays at Earth*, Chapter 2, Cosmic Rays in the Atmosphere, 2001, 249 pages, Copyright Elsevier BV ISBN: 978-0-444-50710-5.

P. K. F. Grieder, *Cosmic Rays at Earth*, Chapter 3, Cosmic Rays in the Atmosphere, 2001, 153 pages, Copyright Elsevier BV ISBN: 978-0-444-50710-5.

J. Gustafsson, *Tomography of Canisters for Spent Nuclear Fuel Using Cosmic-Ray Muons*, Uppsala University, Neutron Physics Report, ISSN 1401-06269, UU-NF 05#08, Oct. 2005, 36 pages.

M.M. Pickrell, *Development of a High-Efficiency Neutron Counter Using Novel Materials*, 5th Nondestructive Assay and Nondestructive Examination Waste Characterization Conference, Salt Lake City, Utah, Jan. 14-16, 1997.

U.S. Appl. No. 12/281,970, filed Sep. 5, 2008, Office Action dated Nov. 1, 2011.

International Search Report and Written Opinion issued Jun. 13, 2012 in PCT Application No. PCT/GB2011/052396, filed Dec. 5, 2011.

Richard T. Kouzes et al., *Cosmic-Ray-Induced Ship-Effect Neutron Measurements and Implications for Cargo Scanning at Borders*, Nuclear Instruments & Methods in Physics Research, Section A vol. 587, No. 1, Dec. 31, 2007, pp. 89-100.

Richard T. Kouzes et al., *Passive Neutron Detection for Interdiction of Nuclear Material at Borders*, Nuclear Instruments & Methods in Physics Research, Section A vol. 584, No. 2-3, Oct. 22, 2007, pp. 383-400.

John Armitage et al., *Cosmic Ray Inspection and Passive Tomography for SNM Detection*, AIP Conference Proceedings, vol. 1194, Jan. 1, 2009, pp. 24-35.

D.C. Stromswold et al., *Field Tests of a NaI(T1)-Based Vehicle Portal Monitor at Border Crossings*, 2004 IEEE Nuclear Science Symposium Conference Record, Oct. 16-22, 2004, pp. 196-200.

K.N. Borozdin et al., *Passive Imaging of SNM with Cosmic-Ray Generated Neutrons and Gamma-Rays*, Nuclear Science Symposium conference Record, Oct. 30, 2010, pp. 3864-3867.

Konstantin N. Borozdin et al., *Scattering Muon Radiography and its Application to the Detection of High-Z Materials*, 2004, IEEE, pp. 1061-1064.

U.S. Appl. No. 12/281,970, filed Jan. 22, 2009, Office Action dated May 31, 2011.

D.H. Beddingfield et al., *Distributed Source Term Analysis, a New Approach to Nuclear Material Inventory Verification*, Nuclear Instruments and Methods in Physics Research, Section A, vol. 485, No. 3, Jun. 11, 2002, pp. 797-804.

PCT/GB2009/002289, Jun. 30, 2010, International Search Report & Written Opinion.

\* cited by examiner

ASSAYING OF WASTE

BACKGROUND OF THE INVENTION

1. Field of the Invention

This invention concerns improvements in and relating to assaying of waste, and particularly, but not exclusively for plutonium in radioactive waste materials in containers.

2. Present State of the Art

To enable safe and cost effective decisions to be taken on the storage, handling and disposal options for nuclear waste it is desirable to be able to characterise that waste through assaying. The lower the limit of detection that can be achieved in an assay, the less margin of uncertainty has to be built into the assay result and any decision taken upon it.

The reduction of the uncertainty applying to the assay of a container increases the number of containers which can be passed to lower grade storage facilities safely. This increases the life of the higher grade stores and reduces the capital costs involved in ensuring sufficient future storage capacity exists.

SUMMARY OF THE INVENTION

According to a first aspect of the invention there is provided a method of investigating a volume of material for radioactive material potentially associated therewith, the method comprising:

providing an investigation location;

providing a first detector, the interaction of one or more types of emission from radioactive material with the first detector causing the first detector to generate a signal;

providing a volume of material at the investigation location;

detecting signals from the first detector caused by the interaction of one or more types of emission from the radioactive material with the first detector;

providing a second detector, the interaction of cosmic rays and/or one or more types of particle generated by cosmic rays with the second detector causing the second detector to generate a signal;

detecting signals from the second detector caused by the interaction of cosmic rays and/or one or more types of particle generated by cosmic rays with the second detector;

processing the signals from the first detector to provide information on the amount of radioactive material associated with the volume of material;

processing the signals from the second detector to provide information on the amount of cosmic rays and/or one or more types of particle generated by cosmic rays incident on the investigation location; and correcting the information on the amount of radioactive material associated with the volume of material using the amount of cosmic rays and/or one or more types of particle generated by cosmic rays incident on the investigation location, thereby providing corrected information on the amount of radioactive material associated with the volume of material.

The processing of the signals from the second detector to provide information on the amount of cosmic rays and/or one or more types of particle generated by cosmic rays incident on the investigation location may provide a correction factor. The correction factor may be based upon the amount of cosmic rays and/or one or more types of particle generated by cosmic rays detected and, preferably, the proportion of cosmic rays and/or one or more types of particle generated by cosmic rays incident upon the investigation location, that are detected by the second detector. The proportion may be a predetermined proportion obtained from a calibration process and/or modelling process.

Preferably the correction factor is used to obtain the corrected information on the amount of radioactive material associated with the volume of material from the information on the amount of radioactive material associated with the volume of material.

According to a second aspect of the invention there is provided a method of investigating a volume of material for radioactive material potentially associated therewith, the method comprising:

providing an investigation location;

providing one or two or more first detectors, the interaction of one or more types of emission from radioactive material with a first detector causing that first detector to generate a signal;

providing a volume of material at the investigation location;

detecting signals from the first detectors caused by the interaction of one or more types of emission from the radioactive material with the first detectors;

providing a second detector, the interaction of cosmic rays and/or one or more types of particle generated by cosmic rays with the second detector causing the second detector to generate a signal;

detecting signals from the second detector caused by the interaction of cosmic rays and/or one or more types of particle generated by cosmic rays with the second detector;

processing the signals from the first detectors to establish occurrences in which signals are detected from one or two or more first detectors within a given time period, the occurrences being coincidence counts;

processing the signals from the second detector and one or more first detectors to establish occurrences in which signals are detected from the second detector and one or more first detectors within a given time period, the occurrences being deemed cosmic related coincidences;

using the processed signals from the first detectors to provide information on the radioactive material associated with the volume of material.

correcting the information on the amount of radioactive material associated with the volume of material using the cosmic related occurrences, thereby providing corrected information on the amount of radioactive material associated with the volume of material.

The processing of the signals from the second detector and one or more first detectors to establish occurrences in which signals are detected from the second detector and one or more first detectors within a given time frame may provide a correction factor. The correction factor may be based upon the amount of cosmic related coincidence detected and, preferably, the proportion of cosmic rays and/or one or more types of particle generated by cosmic rays incident upon the investigation location, that are detected by the second detector. The proportion may be a predetermined proportion obtained from a calibration process and/or modelling process.

Preferably the correction factor is used to obtain the corrected information on the amount of radioactive material associated with the volume of material from the information on the amount of radioactive material associated with the volume of material.

According to a third aspect of the invention there is provided a method of investigating a volume of material for radioactive material potentially associated therewith, the method comprising:

providing an investigation location;

providing a first detector, the interaction of one or more types of emission from radioactive material with the first detector causing the first detector to generate a signal;

providing a volume of material at the investigation location;

detecting signals from the first detector caused by the interaction of one or more types of emission from the radioactive material with the first detector;

providing a second detector, the interaction of cosmic rays and/or one or more types of particle generated by cosmic rays with the second detector causing the second detector to generate a signal;

detecting signals from the second detector caused by the interaction of cosmic rays and/or one or more types of particle generated by cosmic rays with the second detector;

processing the signals from the first detector and second detector to provide processed signals, the processed signals excluding one or more signals from the first detector which are generated within a time period, the time period commencing in response to a signal from the second detector;

using the processed signals to provide information on the radioactive material potentially associated with the volume of material.

The volume of material may be provided within a container. The container may be opaque. The container may be of metal. The container may be of plastics. The container may be sealed. The container may be a drum. The method preferably obtains the information without opening the container. The container may have a volume greater than 40 liters, more preferably greater than 50 liters. The container may have a volume between 40 and 600 liters. The container may be rigid.

The volume of material may include one or more of paper, plastics, wood, rubber, glass, concrete, soil, metal or liquids.

The mass of the material may be measured as a part of the method. The density of the material may be measured as a part of the method.

The radioactive material may include one or more isotopes of one or more elements. In particular, the radioactive material may include plutonium. In particular, the radioactive material may include uranium. The radioactive material may include one or more alpha particle emitters and/or beta particle emitters and/or gamma ray emitters. It is preferred that the radioactive material include one or more neutron emitters.

The investigation location may be provided between a first type detector and a further first type detector. The investigating location may be provided with first type detectors around it. The investigating location may be enclosed by one or more walls, a base and a lid. One or more of the walls may be moveable to allow access to the investigating location. The investigation location may be enclosed in use.

The first detector may produce a signal on interacting with one or more of an alpha particle, a beta particle, a gamma ray, a neutron, an X-ray or a fission fragment.

Preferably the first detector is a neutron detector. The first detector may be a He-3 gas proportional detector.

A plurality of first detectors may be provided. Preferably at least 8 first detectors are provided and more preferably at least 40 first detectors are provided. Preferably first detectors are positioned to extend across at least 50% of the width of the volume of material and/or investigation location. Preferably first detectors are positioned so as to extend along at least 50% of the height of the volume of material and/or investigation location.

The first detector may be provided within a shield. The shield may be of lead or included lead. More preferably the shield is of cadmium or includes cadmium and/or is a polymer or includes a polymer. The shield may be configured to reduce or eliminate one or more types of emission reaching the first detector other than from the investigation location.

The first detector signal is preferably conveyed from the first detector to a processor and/or data storage device.

The first detector may be of a type which is different to the second detector.

Preferably the second detector is a charged particle detector.

The second detector may produce a signal on interacting with a proton, an electron or an atomic nuclei, particularly where that is a cosmic ray and/or is generated by the interaction of a cosmic ray with the Earth's atmosphere. The second detector may produce a signal on interacting with a muon or meson, particularly where generated, directly and/or indirectly, by the interaction of a cosmic ray with the earth's atmosphere. The second detector may produce a signal on interacting with a neutron, particularly where generated by a cosmic ray and/or where generated by a particle generated by a cosmic ray.

The second detector preferably does not produce a signal on interacting with one or more of an alpha particle, a beta particle, a gamma ray, a neutron, an X-ray or a fission fragment, when those are produced by a radioactive decay process, particularly when arising from the investigation location and/or volume of material.

The second detector may produce a signal on interacting with a cosmic ray and/or a particle generated by an interaction involving a cosmic ray and/or a particle generated by an interaction involving a particle generated by an interaction involving a cosmic ray.

The second detector may be a scintillation based detector, such as a plastics scintillator and/or slab scintillator.

One or more second detectors may be provided. Preferably a second detector is provided above the investigation location, most preferably outside shielding provided between the first detector and the environment of the instrument. One or more second detectors may be provided to a side of the investigation location, most preferably outside shielding provided between the first detector and the environment of the instrument.

The second detector or detectors are preferably provided between the investigation location and the field of view for the investigation location with respect to cosmic rays and/or the particles generated by cosmic rays and/or particles generated by particles generated by cosmic rays. The field of view may be a hemispherical field of view, particularly extending about the surface the investigation location is provided on.

Preferably the second detector or detectors are sensitive to a known proportion of the cosmic rays and/or particles generated by cosmic rays and/or further particles generated by particles generated by cosmic rays incident on the investigation location.

Preferably the second detector or detectors are positioned to extend across at least 50% of the width of the volume of material and/or investigation location. Preferably the second detector or detectors are positioned so as to extend along at least 50% of the height of the volume of material and/or investigation location.

The second detector is preferably provided outside of the shield that the first detector and/or investigation location are provided inside of. The shield may be of lead or include lead. More preferably the shield is of cadmium or includes cadmium and/or is a polymer or includes a polymer. The shield may be configured to reduce or eliminate one or more types of emission reaching the second detector, more particularly emissions from the radioactive material associated with the volume of material.

The second detector signal is preferably conveyed from the second detector to a processor and/or data storage device.

The data storage device may be used to record the detector which is the origin of a signal. The data storage device may be used to record the reference time and/or a relative clock time for a signal from a detector. The time may be noted by a time stamper.

The data storage device may be used to provide information on the first detector signals and/or second detector signals to a processor.

The processor may consider the first detector signals and/or second detector signals offline and/or after completion of the collection of the first detector signals and/or second detector signals. The processor may consider the first detector signals and/or second detector signals online and/or before the completion of the collection of the first detector signals and/or second detector signals.

The processor may provide the processed signals.

The time period may commence by starting a predetermined time period after a second detector signal. The time period may commence by starting at the time of the second detector signal. The time period may commence by being defined to end a predetermined time period after a second detector signal. The time period may commence by being defined to have a predetermined duration. The same start and/or duration and/or end may be used for each time period. Different starts and/or durations and/or ends may be used for different time periods. The start and/or duration and/or end of the time period may be related to the energy level of the interaction generating the second detector signal.

The time period may commence at the same time as the second detector signal. The time period may commence as soon as possible after the time of the second detector signal, for instance with the only delay being the response time of any the processing. The time period may commence at a fixed time relative to the second detector signal.

Particularly when applied after detection of the signals, the time period may commence a period of time before the second detector signal.

The time period may commence by being defined to end after the expiry of a time period matching or exceeding the lifetime of a neutron within the investigation location. The lifetime of a neutron may be the time period for there to be a given percentage change of the neutron having been absorbed. The given percentage chance may be at least 50%, potentially at least 75%. The time period may be predetermined, for instance by calibration of the lifetime of a neutron within the investigation location.

The time period may commence by being defined to have a duration of 20 to 500 µs, preferably a duration of 30 to 150 µs, and potentially 35 to 90 µs.

The first detector signals may not be collected during the time period. The first detector signals may be collected during the time period and may then be subsequently excluded. A record of the first detector signals during the time period may be kept. The record may be processed in one or more further stages. A further stage may be provided in which the coincidence count and/or coincidence count rate during the time period is considered. The further stage may use the coincidence count and/or coincidence count rate to investigate the presence and/or absence of one or more elements within the volume of material. The further stage may use the coincidence count and/or coincidence count rate to investigate the quantity and/or level relative to a threshold level of one or more elements within the volume of material. The one or more elements may be high Z elements, for instance elements with an atomic number greater than 56.

During a time period, preferably the signals from all first detectors are excluded.

Where a time period commencing in response to a first signal from a second detector overlaps with a time period commencing in response to another signal from another signal from a second detector, the one or more signals from the first detector may be excluded until the last of the overlapping time periods ends.

The processed signals may include information on the first detector that the signal came from and the timing of the signal, for instance the time of the signal's generation.

The processed signals may be further processed. The further processing of the processed signals may determine the count for one or more of the first detectors and/or the count rate for one or more of the first detectors. The further processing of the processed signals may determine one or more coincidence counts or coincidence count rates for one or more pairs of first detectors and/or larger groupings of first detectors.

One or more of the count, count rate, coincidence count and/or coincidence count rate may be used to quantify the radioactive material associated with the body of material.

The method may include the information on the radioactive material potentially associated with the volume of material being used to quantify the radioactive material within the body of material. The quantification may be corrected for the mass and/or density measured for the volume of material.

The quantification may be compared with a quantity threshold. If the quantity is above the quantity threshold, the body of material may be given a grade. If the quantity is below the quantity threshold, the body of material may be given a different grade.

The information on the radioactive material potentially associated with the body of material may result in the body of material being assigned a grade. The grade may be low level waste, particularly where the total activity level is below a pre-determined level and/or where the plutonium level is below another pre-determined level. The grade may be intermediate level waste, particularly where the total activity level is above a pre-determined level but below a higher pre-determined level and/or where the plutonium level is above another pre-determined level but below another higher pre-determined level. The grade may be plutonium contaminated and/or containing material, particularly where the plutonium level is above another pre-determined level.

The method may include the step of obtaining a body of material from a store of a first type. The method may include returning the body of material to a type of store dependent upon the information obtained in the method. The type of store to which the body of material is sent after the method may be a different store to the first type, particularly where the quantity of radioactive material is below a threshold and/or the quantity of plutonium is below another threshold.

The method may include sending the body of material to a location type after the information has been obtained. The body of material may be sent to a location type after a grade has been assigned to the body of material. The location type may be a type of store. Two or more different location types may be used. The location types may differ in terms of one or more physical characteristics of the location type.

The method may provide that the signals from the first detector are processed in two different ways. The first way may give a first form and the second way a second form. The first form and the second form may be used to give a corrected form.

The method may include processing of the signals from the first detector and second detector to provide processed signals. The processed signals may exclude one or more signals from the first detector which are generated within a time period. The time period may commence in response to a signal from the second detector. The method may further include using the processed signals to provide information on the radioactive material potentially associated with the volume of material. The method may include the processed signals for the first detector being subject to processing. The processing of the signals may determine one or more first coincidence counts or first coincidence count rates for one or more pairs of first detectors and/or larger groupings of first detectors. For instance, this may provided the first way and/or result in the first form.

The method may include the signals from the first detectors being subject to further processing. The further processing of the signals may determine one or more second coincidence counts or second coincidence count rates for one or more pairs of first detectors and/or larger groupings of first detectors. For instance, this may provided the second way and/or result in the second form.

The method may include the first coincidence count rate for the processed signals of the first detector and the second coincidence count rate for the further processed signals of the first detector being obtained for one or more periods of time. Many such pairs each for a separate time period may be obtained.

The method may include the first coincidence count rate for the further processed signals of the first detector for a period of time being subtracted from the second coincidence count rate for the processed signals of the first detector for the same period of time. The method may include the difference being multiplied by the correction factor. The method may include the difference multiplied by the correction fact being subtracted from the second coincidence count rate to give a corrected coincidence count rate. The method may include the corrected coincidence count rate being used to give the information on the amount of radioactive material associated with the volume of material.

The method may provide that the correction factor is selected from amongst a plurality of correction factors. The method may provide that the selection of the correction factor is based upon the container and/or estimated container contents for investigation.

The method may provide that the correction factor has been obtained from a calibration method. The calibration method may include one or more experimental simulations of the method of investigating. The simulation may include a simulation of one or more of the following: the volume of material provided within the container; the type of material provided within the container; the density of material provided within the container; the distribution of material provided within the container; the investigating location; the position of the container within the investigating location; the first detector type and/or geometry and/or position relative to the investigating location; the second detector type and/or geometry and/or position relative to the investigating location; the instrument; the environment for the instrument. The calibration method may include a plurality of experimental simulations being performed. The method may include one or more correction factors being generated.

The first and/or second and/or third aspects of the invention may include any of the features, options or possibilities set out in the other aspects of this invention and/or elsewhere in this document.

According to a fourth aspect of the invention there is provided an apparatus for investigating a volume of material for radioactive material potentially associated therewith, the apparatus comprising:

an investigation location;

a first detector, the interaction of one or more types of emission from radioactive material with the first detector causing the first detector to generate a signal;

a second detector, the interaction of cosmic rays and/or one or more types of particle generated by cosmic rays with the second detector causing the second detector to generate a signal;

a processor, the processor being configured to receive signals from the first detector caused by the interaction of one or more types of emission from the radioactive material with the first detector, receive signals from the second detector caused by the interaction of cosmic rays and/or one or more types of particle generated by cosmic rays with the second detector, processing the signals from the first detector to provide information on the amount of radioactive material associated with the volume of material, process the signals from the second detector to provide information on the amount of cosmic rays and/or one or more types of particle generated by cosmic rays incident on the investigation location and correct the information on the amount of radioactive material associated with the volume of material using the amount of cosmic rays and/or one or more types of particle generated by cosmic rays incident on the investigation location, thereby providing corrected information on the amount of radioactive material associated with the volume of material.

According to a fifth aspect of the invention there is provided apparatus for investigating a volume of material for radioactive material potentially associated therewith, the apparatus comprising:

an investigation location;

two or more first detectors, the interaction of one or more types of emission from radioactive material with a first detector causing that first detector to generate a signal;

a second detector, the interaction of cosmic rays and/or one or more types of particle generated by cosmic rays with the second detector causing the second detector to generate a signal;

a processor, the processor being configured to receive and process the signals from the first detectors to establish occurrences in which signals are detected from two or more first detectors within a given time period, the occurrences being deemed coincidence counts, process the signals from the second detector and one or more first detectors to establish occurrences in which signals are detected from the second detector and one or more first detectors within a given time period, the occurrences being deemed cosmic related coincidences, use the processed signals from the first detectors to provide information on the radioactive material associated with the volume of material and correct the information on the amount of radioactive material associated with the volume of material using the cosmic related occurrences, thereby providing corrected information on the amount of radioactive material associated with the volume of material.

According to a sixth aspect of the invention there is provided an apparatus for investigating a volume of material for radioactive material potentially associated therewith, the apparatus comprising:

an investigation location;

a first detector, the interaction of one or more types of emission from radioactive material with the first detector causing the first detector to generate a signal;

a second detector, the interaction of one or more types of particle generated by cosmic rays with the second detector causing the second detector to generate a signal;

a processor, the processor being configured to produce processed signals in which the signals from the first detector are excluded for a time period, the time period being commenced in response to a signal from the second detector;

an indicator, the indicator producing or displaying information on the radioactive material potentially associated with the volume of material.

The fourth and/or fifth and/or sixth aspects of the invention may include any of the features, options or possibilities set out in the first aspect of this invention and/or elsewhere in this document.

BRIEF DESCRIPTION OF THE DRAWINGS

Various embodiments of the invention will now be described, by way of example only, and with reference to the accompanying drawings in which.

DETAILED DESCRIPTION OF THE PREFERRED EMBODIMENTS

Figure 1:
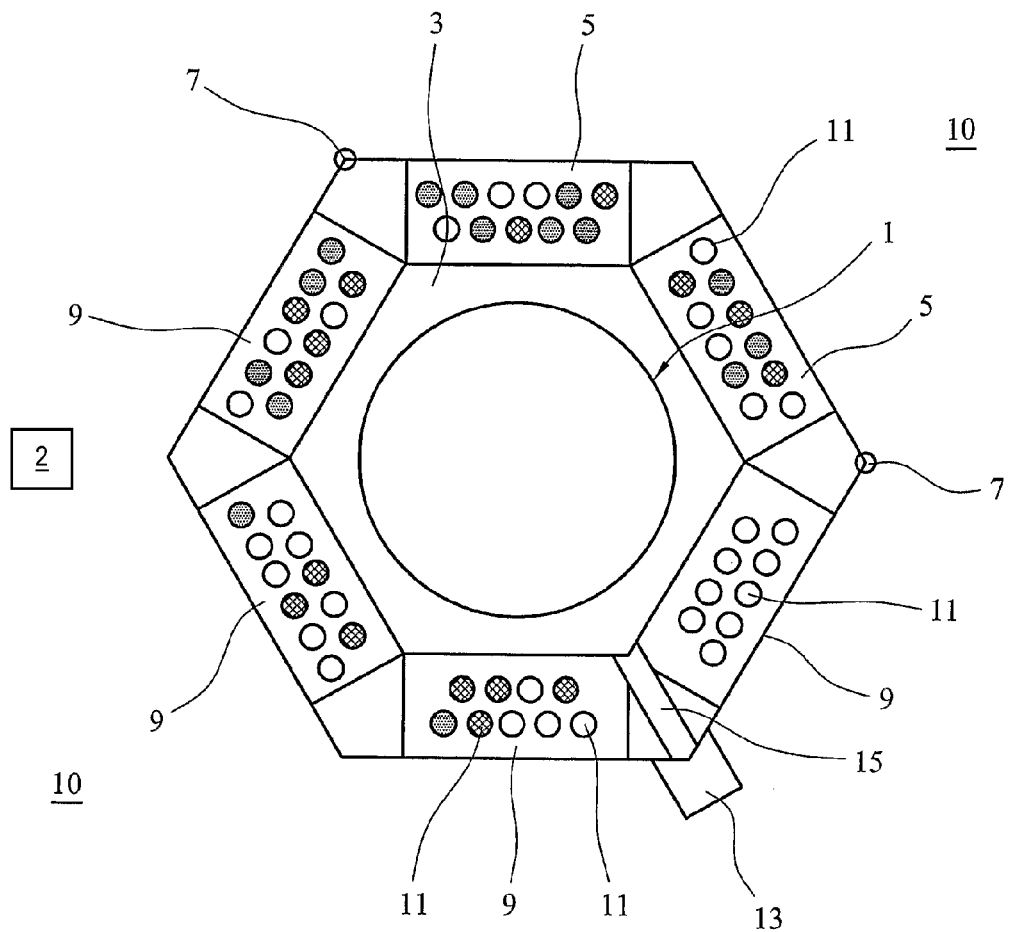
FIG. 1 is a cross-section plan view of an instrument suitable for modification to perform the invention.

FIG. 1 illustrates a cross-sectional plan view through an instrument designed to perform a non-destructive assay of nuclear material contained within a container, such as a drum 1. The drum 1 is introduced into the chamber 3 through an opening formed when two walls 5 are opened about hinges 7. The chamber 3 has a base and lid, as well as four fixed walls 9 and the two movable walls 5. All of these are lined with cadmium and a polymer so as to shield the surrounding area 10 during the assaying.

The instrument is particularly concerned with measuring radioactive materials within the drum 1, where those radioactive materials are or could potentially be fissile material, and in particular plutonium.

To monitor the drum 1 for the radioactive material it may contain, the walls 5, 9 of the chamber 3 are provided with a number of neutron detectors 11 surrounding the chamber 3. Each of the walls 5, 9 is provided with a number of helium-3 gas filled neutron proportional detectors 11. These may be positioned in a number of staggered layers to maximise detector efficiency.

In operation, each interaction between a neutron and the neutron detector 11 results in a signal. The processing electronics for the instrument, not shown, collect the identify of the detector 11 from which the signal is generated and the time of its occurrence. The counting electronics enable high count rates to be considered, up to one million counts processed per second. Further details of suitable counting electronics are to be found in EP 1175627 and EP 1707992, the contents of which are incorporated herein by reference, particularly with respect to the details and construction of the neutron counting electronics they provide and the operation of the same.

Analysis of the signals generated enables the system to establish coincidences of neutrons. That is to say, a series of signals which occur within a given time frame of the first such signal, thereby implying that they arise from the same neutron generating event. The count rate for the multiplicities is used to establish the fission rate within the radioactive waste and hence the mass of fissile material present. The result may be used to guide the subsequent processing and/or handling of the drum 1. For instance the instrument can be used to make a distinction between low level waste, LLW and intermediate level waste, ILW and in particular the plutonium contaminated material, PCM, category thereof.

Where desired, the passive neutron based measurement from the instrument may be backed up by a high resolution gamma spectroscopy system. The measurement unit for the HRGS, 13 is positioned to one side of the instrument and can be moved up and down as desired so as to view the full height of the drum 1. The HRGS unit 13 views the chamber 3 inside via slit 15. The HRGS unit 13 can be used to evaluate the distribution material within the drum 1.

To enable segregation of waste types and/or to provide the most accurate classification of the amount of fissile material within a container 1, a measurement process needs to have as low a limit of detection as possible.

A significant issue with the limit of detection (LOD) and/or minimum detectable activity (MDA) is the need to distinguish signals, and hence coincidences, which arise from neutrons generated by the fissile material within the container 1, when compared with signals arising other than from the fissile material in the container 1. This is the background signal level. To establish as low a LOD and/or MDA as possible, it is necessary to know this background signal level as precisely as possible and also to know that the background signal level is applicable at the timing of the measurement to be corrected. The most significant source of signals, other than from the fissile material, are cosmic rays.

Cosmic rays are high-energy particles that enter the atmosphere of the Earth from space, having arisen from non-Earth sources. These include cosmic rays arising from the Sun and still higher energy cosmic rays from galactic sources. The cosmic rays are mostly pieces of atoms, that is protons, electrons and atomic nuclei (which have had all of the surrounding electrons stripped from them). As a consequence these particles are all charged particles. The term ray is to an extent misleading as the particles arrive and interact individually with the atmosphere and detectors. This individual nature is important in the context of accounting for the signals generated in the detectors 11 by these sources. If an instrument includes in its processing, signals generated (directly or indirectly) by these sources, in addition to the neutrons from the fissile material, then the count and coincidence count will be too high and will have a degree of uncertainty associated with it.

When a cosmic ray particle enters the earth's atmosphere, it collides with molecules in the atmosphere, mainly oxygen and nitrogen or eventually a liquid or solid object. This interaction produces a cascade of generated particles. Where the interaction occurs inside the chamber 3, these particles, or at least the neutron part thereof, may then interact with a detector. The energy of the cosmic ray particle means that an extremely large number of generated particles can be generated in this way. The random nature of the collision process, and the fact that the products of the collision process remain within a cone extending directly away from the collision point and having a narrow angle (a degree or so), means that the presence or absence of such bursts of generated particles at any one point in time can be highly localised. The occurrence of such interactions means that bursts of signals tend to occur.

As well as the particles (including neutrons) generated directly by the cosmic ray in this first type of interaction, those particles generated by the cosmic ray in the first type of interaction may also interact with the atmosphere or a liquid or solid object. This second type of interaction provides further particles (including neutrons) generated by the cosmic ray. These too are susceptible to detection when they are generated in the chamber 3.

The shielding for the chamber 3 tends to exclude neutrons generated by cosmic rays and by particles generated by cosmic rays, where the neutrons arise outside the chamber. However, their generation inside the chamber is perfectly possible.

Attempts have been made to exclude at least some cosmic rays particles and at least some of the generated particles from being signal generating sources in a variety of ways.

In one such approach, the counts detected are placed into a series of time segments, so as to give a count for each segment. For instance a measurement time of 20 minutes may be divided up into a series of 20 second long segments. Normally within any such segment, a count rate of 1, 2 or 3 might be expected as a result of neutrons generated by the fissile material. However, during the brief point in time at which the location is exposed to a large burst of generated particles, this count rate could soar to 30 or more events. It is possible to define a threshold so as to distinguish between segments which predominantly reflect the fissile material generated neutrons and those segments in which a large contribution from cosmic rays generated particles arise. For instance, it is possible to take the mean count rate and place the threshold at a given number of standard deviations above that mean. Segments in which a count higher than the threshold are observed could then either be discarded entirely from any further part in the processing to give the level of fissile material or could be capped at a particular count.

A problem with this approach is that not all cosmic ray generated particles occur in such large bursts. So called, small bursts also occur and these have a far lower count and do not present a discernable increase in count which would give rise to suspicion for a segment.

Small bursts are believe to arise as a result of the generated particles arising from the initial cosmic ray particle's interaction with the atmosphere, then going on themselves to interact with the Earth's atmosphere or more solid objects so as to generate further generated particles; the second type of interaction. The further generated particles give the small burst, as the number of further generated particles from the second or further interactions is less than in the initial interaction due to the decrease in energies involved in each subsequent interaction. These further interactions do not generate a very large number of particles and hence signals in the detectors. Instead the number of particles generated is quite small, for instance 2, 4, or so, with only a proportion of these being detected. As a result, when such further generated particles reach the detectors of the instrument, they generate signals of a form and frequency which makes them indistinguishable from the signals generated by neutrons from the fissile material.

Thus, whilst it is possible to exclude large burst particles because they appear different to fissile neutrons in terms of the signals generated, the small burst particles appear to be fissile generated neutrons and hence cannot be readily excluded.

In one further instrument, a blunt approach to the exclusion of sources from other than the fissile material is taken The large number of detectors used are split into a series of modules, perhaps having 10 detectors in each. When a neutron generates a signal in a detector in a module, none of the signals in any of the detectors in that module are taken into account for a set time period thereafter. Thus, there is no possibility of obtaining a coincidence count between two signals from two detectors in the same module, as all potential coincidences from the same module are discounted. This approach is taken on the basis that cosmic ray originating neutrons will arise with a high degree of physical proximity and directional orientation relative to one another due to the generation method. As such, they may be seen by the various detectors of a module, but not by two different modules. On this basis, it is believed that all the cosmic originating neutrons are excluded. Neutron coincidences from the fissile material are detected where one signal arises in one module and the other arises (relatively soon thereafter) in another module.

Because the fission generated neutrons move in random directions, those still have a chance of being counted during the time in which a module is off.

This process of turning the modules of detectors off occurs for a given time period after each signal detected by any of the detectors in a module. As a result of this process, the instrument can have a significant number of the detectors off-line at any one point. Thus, a neutron coincidence for the fissile material will only arise when the first signal occurs in a module which has not been turned off by a cosmic originating neutron and the second signal occurs in a separate module which has also not been turned off by a cosmic originating neutron. As a consequence the efficiency of the system in counting neutrons arising from the fissile material is low, the count rate times are increased and the time taken to process a given number of drums or other containers is increased.

In a first solution embodiment of the present invention, the arrangement of FIG. 1 is supplemented with a dedicated cosmic ray generated particle detector 2. This takes the form of one or more slab type scintillators provided with a photomultiplier and supporting electronics to enable particle interactions with at least one of the scintillators to be detected. The scintillators are provided in proximity with the instrument and preferably directly above the instrument.

Because the scintillators are provided outside of the shielding which encloses the chamber 3, the scintillator is effectively shielded against detecting any emissions emanating from the chamber. Hence, the cosmic ray detector 2 provides a measure only of the cosmic rays or cosmic ray generated particles (first type of interaction) or cosmic ray generated further particles (second type of interaction) which could contribute to the count from the neutron detectors of the instrument. If it is believed that the scintillator is sensitive to gamma ray interactions, then a suitable discriminator can be provided to exclude that part of the signal.

The signals generated by the scintillators are collected and have their time of origin also recorded. In this respect, the scintillator is treated in exactly the same way as the signals from the neutron detectors.

Figure 2:
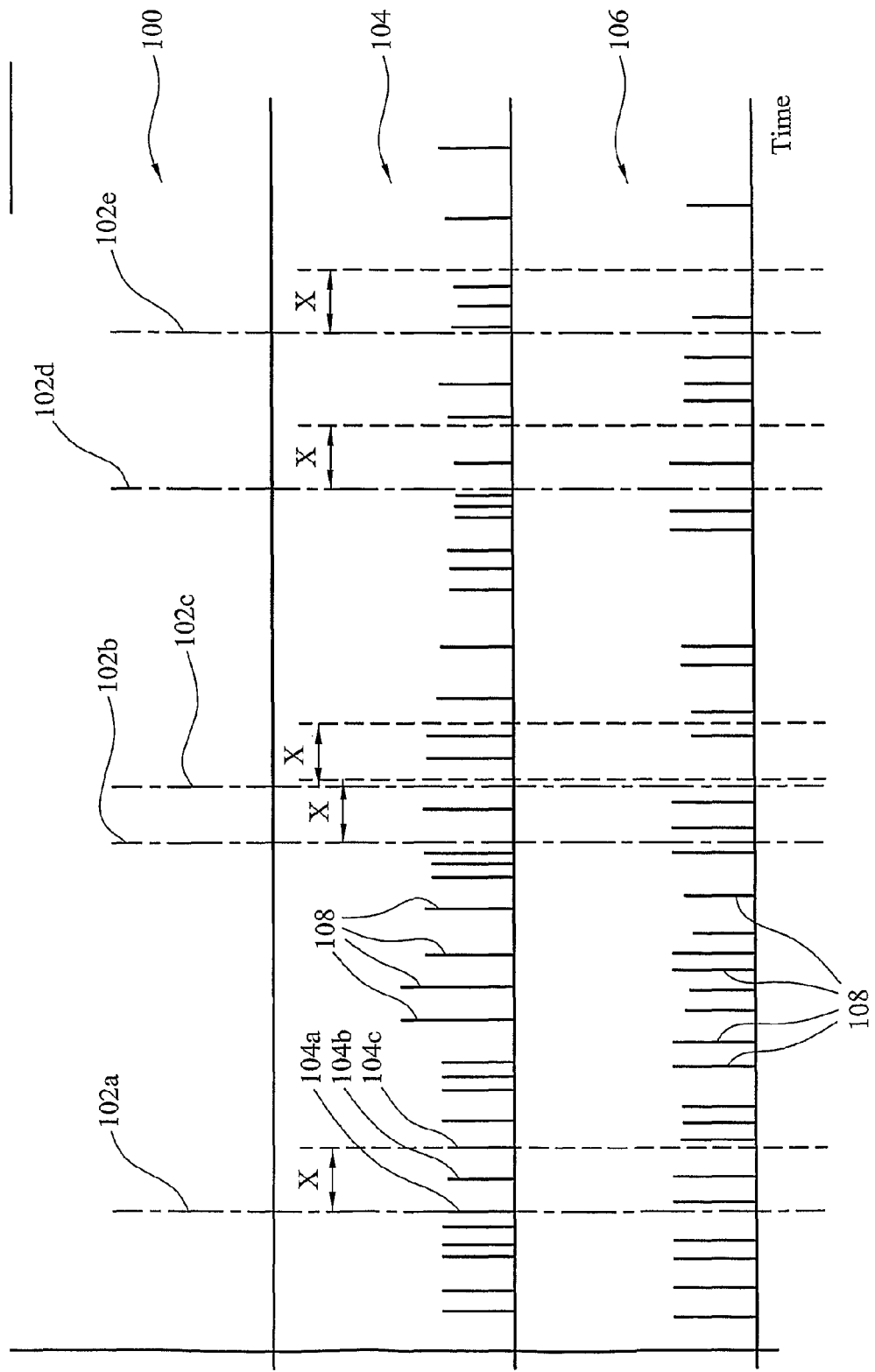
FIG. 2 is a schematic illustration of the signal with time plots for three detectors used in accordance with the present invention.

FIG. 2 illustrates the purpose to which signals from the cosmic ray or cosmic ray generated particle or cosmic ray generated further particle detector are put. The signals from this detector are shown on the top trace, 100. In this schematic illustration five separate event signals, 102*a, b, c, d* and *e* are detected during the part of the trace shown. The traces 104 and 106 represent the signal traces for two of the neutron detectors included in the instrument. As schematically shown, these feature a large number of event signals 108.

The event signals 102*a, b, c, d, e* from the cosmic ray or cosmic ray generated particle or cosmic ray generated further particle detector 100 are each used in an equivalent manner. Each marks the start of a time period x, during which any signals from detectors 104, 106 and all the other detectors are excluded from further consideration. These event signals from the neutron detectors are excluded on the basis that they could be generated by cosmic ray or cosmic ray generated particles or cosmic ray generated further particles. It does not matter that this potentially excludes neutrons detected from fission events because the instrument is still functioning and detecting such events for the majority of the instrument's operating time.

Referring to FIG. 2, the time period after signal 102a excludes signals 104a, 104b and 104c. The time period generated by signal 102b is still not ended when signal 102c generates a further time period. Thus any signal falling within either of these two time periods are excluded from further consideration.

This means that the invention effectively excludes all signals generate by cosmic ray generated particles or cosmic ray generated further particles, whether those be in large bursts or whether those be in small bursts. As there is greater surety that the cosmic ray generated particles and cosmic ray generated further particles, and hence their events, are excluded from the signals then used in the determination of the fissile material within a container, the background noise and limit of detection are greatly improved.

Furthermore, though the neutron detectors are all turned off for the time period x, that time period x is only triggered when the dedicated cosmic ray, cosmic ray generated particle and cosmic ray generated further particle detector is triggered. This system down time may be greater, less or comparable with the system down time of the prior art instruments but it will only be down when there is a real need for the signal observed in a first detector really to be rejected. The present invention will miss a lower percentage of the real events from the volume of material. In addition, the present invention accounts for all mechanisms of production of interfering neutrons, as a result of cosmic ray interaction with the measurement chamber as a whole, and is not reliant on assumptions on where the interaction took place.

The time period x is carefully selected to reflect the fact that the cosmic rays and cosmic ray generated particles have a very high energy and hence from the point in time at which they are detected by the cosmic ray generated particle detector to when they have passed the point at which they could be detected by the neutron detectors of the instrument is quite long. This is because it takes time for the energy to be reduced to the point where they are detected.

The proportion of cosmic rays, cosmic ray generated particles and cosmic ray generated further particles detected by the scintillator can be varied by changing its thickness and/or the material used within it.

The overall impact of the process is that the signals from the neutron detectors within the instrument are cleaned so as to remove any such signals which could have been generated by cosmic rays. The cleaned signals are then used in the neutron coincidence count determination as before. This is also an improved result, however, as spurious coincidences caused by cosmic rays do not feature.

The first solution embodiment of the present invention is most beneficial. However, whilst the approach seeks to exclude all signals generate by cosmic ray generated particles or cosmic ray generated further particles from contributing to the signal, to do so they must be detected. If a cosmic ray generated particle or cosmic ray generated further particle is not detected, then it is not present in the signals to start a time period x during which the neutron detectors are off.

Experimental research has shown that even a large number of scintillators all around the chamber 3 cannot ensure all of the cosmic ray generated particles or cosmic ray generated further particles are detected. Hence, the signals attributed to the container 1 will include signals caused by cosmic ray generated particles or cosmic ray generated further particles. This could result in an over estimation of the activity associated with the container 1.

Additionally, the more scintillators that are deployed, the greater the system cost in terms of those components and their supporting electronics.

In a second solution embodiment of the present invention, the above mentioned issues are addressed and the background is established even more accurately.

As with the first solution, the signals from the neutron detectors 11 are obtained and the signals from the dedicated cosmic ray generated particle detector are obtained. Thus there is a measure of the cosmic ray generated particles or cosmic ray generated further particles signal, as observed by the dedicated cosmic ray generated particle detector, and a measure to the total signal, as observed by the neutron detectors 11.

Using the approach discussed in the first solution, the cosmic ray generated particles or cosmic ray generated further particles signals can be used to exclude from the total signal those signals seen as being caused by cosmic ray generated particles or cosmic ray generated further particles.

As a result, there is a total signal from the neutron detectors 11 and a cleaned signal from the neutron detectors 11. These two signals can be processed to determine the coincidence rates observed in each of a series of equivalent and sequential time periods, for instance of 100 seconds each (with 200 kg of lead at the investigating location); see Table 1.

TABLE 1

| Time Period | Total Signal Rate | Cleaned Signal Rate | Total Signal Coincidence Rate | Cleaned Signal Coincidence Rate |
|---|---|---|---|---|
| 1 | 3.40 | 2.90 | 0.30 | 0.30 |
| 2 | 2.80 | 2.40 | 0.30 | 0.30 |
| 3 | 3.90 | 3.40 | 0.30 | 0.30 |
| 4 | 4.10 | 3.50 | 0.30 | 0.30 |
| 5 | 4.20 | 3.20 | 0.20 | 0.10 |
| 6 | 3.80 | 3.20 | 0.50 | 0.40 |
| 7 | 3.30 | 2.60 | 0.30 | 0.10 |
| 8 | 3.60 | 2.60 | 1.30 | 0.90 |
| 9 | 2.40 | 2.10 | 0.10 | 0.10 |
| 10 | 2.40 | 2.10 | 0.30 | 0.20 |

As can be seen in Table 1, the total signal coincidence rate is always higher than the cleaned signal coincidence rate as the later is a subset of the signals in the former. Additionally, there is a correlation between the two count rates; the higher one is, the higher the other is.

The measured difference between the total signal coincidence rate and the cleaned signal coincidence rate is obtained by subtraction. This coincidence rate difference is then multiplied by a correction factor. The result is then subtracted from the total signal coincidence rate to give a corrected coincidence rate. This corrected coincidence rate is then used in the determination of the radioactive material content of the container.

In more detail, this process is performed by providing the total signal (designated 1 in the formulae) and the parallel obtained cleaned signal (designated 2 in the formulae). Each segment or time period of each acquisition is then processed to obtain the total and cleaned signal coincidence rates (reals rate) ($x_1$) and ($x_2$). A segment filter is applied to each acquisition and the accepted segments from $x_1$ and $x_2$ are then subject to covariance analysis. As both $x_{1i}$ and $x_{2i}$ were obtained from the same signal stream all of the events in $x_{2i}$ will also be in $x_{1i}$. However a number of events will have been removed. Therefore $x_{1i}$ and $x_{2i}$ will be strongly covariant. Using the formula below, the means, variances and covariance can be calculated.

$$\bar{x}_1 = \sum_{i=1}^{n} \frac{x_{1i}}{n.} \quad \sigma_{x_1}^2 = \sum_{i=1}^{n} \frac{(x_{1i} - \bar{x}1)^2}{n.(n-1)}$$

$$\bar{x}2 = \sum_{i=1}^{n} \frac{x_{2i}}{n.} \quad \sigma_{x_2}^2 = \sum_{i=1}^{n} \frac{(x_{2i} - \bar{x}_2)^2}{n.(n-1)}$$

$$\mathrm{cov}(x_1, x_2) = \sum_{i=1}^{n} \frac{(x_{1_i} - \bar{x_1})(x_{2_i} - \bar{x_2})}{n.(n-1)}$$

As $x_2$ has identified only a fraction (1/F) of the background events in $x_1$ then the corrected signal coincidence rate (y) will be:

$$y = x_1 - F(x_1 - x_2)$$

With an uncertainty given by:

$$\sigma_y^2 = \left(\frac{\delta y}{\delta x_1}\right)^2 \sigma_{x_1}^2 + 2 \cdot \left(\frac{\delta y}{\delta x_1}\right)\left(\frac{\delta y}{\delta x_2}\right) \mathrm{cov}(x_1 x_2) + \left(\frac{\delta y}{\delta x_2}\right)^2 \sigma_{x_2}^2$$

Where:

$$\frac{\delta y}{\delta x_1} = -(F-1) \quad \frac{\delta y}{\delta x_2} = F$$

Therefore:

$$\sigma_y^2 = (F-1)^2 \sigma_{x_1}^2 - 2 \cdot (F-1) F \mathrm{cov}(x_1 x_2) + F^2 \sigma_{x_2}^2$$

This corrected coincidence rate y and associated error $\sigma_y$ are then used to calculate the radioactivity level, for instance the plutonium mass.

Importantly, the component of the coincidence count rate which is attributable to cosmic rays is determined by comparing the total signal coincidence and the cleaned signal coincidence, rather than by simply directly measuring the reals rate coincident with the cosmic ray events.

The correction factor itself can be obtained from an experimental or computer model based consideration of the fraction of the signals arising from the neutron detectors 5 which are detected by the dedicated cosmic ray generated particle detector, under conditions where all signals are presumed to be as a result of cosmic rays. Typically, this is achieved by conducting a series of calibration tests. In the calibration tests, the instrument will be in the same configuration as that used for containers 1 with radioactivity associated with them. This will ensure that instrument geometry effects do not change the result between the calibration and the use. The calibration tests are conducted with containers 1 present, but with those containers lacking any signal source. The containers 1 are otherwise the same as those encountered in terms of container material and geometry. The contents of the containers 1 also seek to reflect the contents in tests relating to containers 1 associated with radioactive material. Thus the waste inside the container may be represented as accurately as possible. Different representations to reflect different waste stream types may be considered in the calibration tests.

In order for this correction technique to work well the correction factor F should be accurately determined. This factor describes the efficiency with which the signals caused by cosmic ray interactions are identified. This factor will be governed by a number of factors including the geometry of the cosmic ray detector and the method by which outlying segments are rejected. The correction factor should also be as representative of the entire waste item volume as possible in order to yield a useful correction.

In the solutions provided above, there are clear benefits to be had from the consideration of the background being made at the same time as the consideration of the drum 1. The possibility of the background being different during the measurement from the time at which the background was determined is eliminated by such an approach.

The invention claimed is:

1. A method of investigating a volume of material for radioactive material potentially associated therewith, the method comprising:
   providing an investigation location;
   providing a first detector, the interaction of one or more types of emission from radioactive material with the first detector causing the first detector to generate a signal;
   providing a volume of material at the investigation location;
   detecting signals from the first detector caused by the interaction of one or more types of emission from the radioactive material with the first detector;
   providing a second detector, the interaction of cosmic rays and/or one or more types of particle generated by cosmic rays with the second detector causing the second detector to generate a signal;
   detecting signals from the second detector caused by the interaction of cosmic rays and/or one or more types of particle generated by cosmic rays with the second detector;
   processing the signals from the first detector to provide information on the amount of radioactive material associated with the volume of material;
   processing the signals from the second detector to provide information on the amount of cosmic rays and/or one or more types of particle generated by cosmic rays incident on the investigation location to provide a correction factor; and
   correcting the information on the amount of radioactive material associated with the volume of material using the correction factor provided from the amount of cosmic rays and/or one or more types of particle generated by cosmic rays incident on the investigation location, thereby providing corrected information on the amount of radioactive material associated with the volume of material.

2. A method according to claim 1 in which the correction factor is based upon the proportion of cosmic rays and/or one or more types of particle generated by cosmic rays incident upon the investigation location, that are detected by the second detector.

3. A method according to claim 2 in which the proportion is a predetermined proportion obtained from a calibration process.

4. A method according to claim 1 in which the signals from the first detector are processed in two different ways.

5. A method according to claim 1 in which the processing of the signals from the first detector and second detector provides processed signals, the processed signals excluding one or more signals from the first detector which are generated within a time period, the time period commencing in response to a signal from the second detector; and using the processed signals to provide information on the radioactive material potentially associated with the volume of material.

6. A method according to claim 5 in which the processed signals for the first detector are subject to processing, the processing of the signals determining a first coincidence count or first coincidence count rate for one or more pairs of first detectors and/or larger groupings of first detectors and a second coincidence count or second coincidence count rate for one or more pairs of first detectors and/or larger groupings of first detectors.

7. A method according to claim 6 in which the first coincidence count rate for the processed signals of the first detector and the second coincidence count rate for the further processed signals of the first detector are obtained for one or more periods of time.

8. A method according to claim 7 in which the first coincidence count rate for the further processed signals of the first detector for a period of time is subtracted from the second coincidence count rate for the processed signals of the first detector for the same period of time.

9. A method according to claim 8 in which the difference is multiplied by the correction factor.

10. A method according to claim 9 in which the difference multiplied by the correction fact is subtracted from the second coincidence count rate to give a corrected coincidence count rate and the corrected coincidence count rate is used to give the information on the amount of radioactive material associated with the volume of material.

11. A method according to claim 1 in which the signals from the first detector is subject to further processing, the further processing of the signals determining one or more second coincidence counts or second coincidence count rates for one or more pairs of first detectors and/or larger groupings of first detectors.

12. A method according to claim 1 in which the correction factor is selected from amongst a plurality of correction factors.

13. A method according to claim 12 in which the selection of the correction factor is based upon the container and/or estimated container contents for investigation.

14. A method according to claim 1 in which the information on the radioactive material potentially associated with the volume of material being used to quantify the radioactive material within the body of material; the quantification is compared with a quantity threshold and if the quantity is above the quantity threshold, the body of material is given a grade and/or if the quantity is below the quantity threshold, the body of material is given a different grade.

15. A method according to claim 1, in which the method includes the step of obtaining a body of material from a store of a first type and the method includes returning the body of material to a type of store dependent upon the information obtained in the method.

16. A method according to claim 1 in which the correction factor has been obtained from a calibration method.

17. A method according to claim 16 in which the calibration method includes one or more experimental simulations of the method of investigating, the simulation including a simulation of one or more of the following:
the volume of material provided within a container provided at the investigation location;
the type of material provided within a container provided at the investigation location;
the density of material provided within a container provided at the investigation location;
the distribution of material provided within a container provided at the investigation location;
the investigating location;
the position of a container within the investigating location;
the first detector type and/or geometry and/or position relative to the investigating location;
the second detector type and/or geometry and/or position relative to the investigating location;
an instrument for performing the method;
the environment for an instrument for performing the method.

18. A method according to claim 17 in which a plurality of experimental simulations are performed.

19. A method according to claim 16 in which one or more correction factors are generated.

20. Apparatus for investigating a volume of material for radioactive material potentially associated therewith, the apparatus comprising:
an investigation location;
a first detector, the interaction of one or more types of emission from radioactive material with the first detector causing the first detector to generate a signal;
a second detector, the interaction of cosmic rays and/or one or more types of particle generated by cosmic rays with the second detector causing the second detector to generate a signal;
a processor, the processor being configured to receive signals from the first detector caused by the interaction of one or more types of emission from the radioactive material with the first detector, receive signals from the second detector caused by the interaction of cosmic rays and/or one or more types of particle generated by cosmic rays with the second detector, process the signals from the first detector to provide information on the amount of radioactive material associated with the volume of material, process the signals from the second detector to provide information on the amount of cosmic rays and/or one or more types of particle generated by cosmic rays incident on the investigation location to provide a correction factor, and correct the information on the amount of radioactive material associated with the volume of material using the correction factor provided from the amount of cosmic rays and/or one or more types of particle generated by cosmic rays incident on the investigation location, thereby providing corrected information on the amount of radioactive material associated with the volume of material.

21. A method of investigating a volume of material for radioactive material potentially associated therewith, the method comprising:
providing an investigation location;
providing a first detector, the interaction of one or more types of emission from radioactive material with the first detector causing the first detector to generate a signal;
providing a volume of material at the investigation location;
detecting signals from the first detector caused by the interaction of one or more types of emission from the radioactive material with the first detector;
providing a second detector, the interaction of cosmic rays and/or one or more types of particle generated by cosmic rays with the second detector causing the second detector to generate a signal;
detecting signals from the second detector caused by the interaction of cosmic rays and/or one or more types of particle generated by cosmic rays with the second detector;

processing the signals from the first detector to provide information on the amount of radioactive material associated with the volume of material;

processing the signals from the second detector to provide information on the amount of cosmic rays and/or one or more types of particle generated by cosmic rays incident on the investigation location to provide a correction factor; and correcting the information on the amount of radioactive material associated with the volume of material using the correction factor provided from the amount of cosmic rays and/or one or more types of particle generated by cosmic rays incident on the investigation location, thereby providing corrected information on the amount of radioactive material associated with the volume of material, wherein the correction factor is selected from amongst a plurality of correction factors and wherein the selection of the correction factor is based upon the container and/or estimated container contents for investigation.

* * * * *